United States Patent
Yasaki et al.

(10) Patent No.: US 10,440,111 B2
(45) Date of Patent: Oct. 8, 2019

(54) APPLICATION EXECUTION PROGRAM, APPLICATION EXECUTION METHOD, AND INFORMATION PROCESSING TERMINAL DEVICE THAT EXECUTES APPLICATION

(71) Applicant: FUJITSU LIMITED, Kawasaki-shi, Kanagawa (JP)

(72) Inventors: Koichi Yasaki, Kawasaki (JP); Hidenobu Ito, Kawasaki (JP); Yosuke Nakamura, Kawasaki (JP); Takuya Sakamoto, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 720 days.

(21) Appl. No.: 14/930,002

(22) Filed: Nov. 2, 2015

(65) Prior Publication Data

US 2016/0057228 A1 Feb. 25, 2016

Related U.S. Application Data

(63) Continuation of application No. PCT/JP2013/064642, filed on May 27, 2013.

(51) Int. Cl.
*G06F 15/16* (2006.01)
*H04L 29/08* (2006.01)
(Continued)

(52) U.S. Cl.
CPC .......... *H04L 67/1097* (2013.01); *G06F 9/445* (2013.01); *G06F 21/121* (2013.01);
(Continued)

(58) Field of Classification Search
CPC ........ G06F 21/121; G06F 21/62; G06F 9/445; H04L 61/20; H04L 67/02; H04L 67/1097; H04L 67/20; H04L 67/26
See application file for complete search history.

(56) References Cited

U.S. PATENT DOCUMENTS 7,818,435 B1 * 10/2010 Jellinek ............ G06F 17/30902
709/203
2005/0228990 A1 10/2005 Kato et al.
(Continued)

FOREIGN PATENT DOCUMENTS

JP 2004-094682 3/2004
JP 2005-235055 9/2005
(Continued)

OTHER PUBLICATIONS

Fujitsu Laboratories Ltd.,"Fujitsu Develops Information Device Technology to Automatically Deliver and Run Applications Needed at Particular Time and Place—Fujitsu Global", Jul. 19, 2011 (Jul. 19, 2011), pp. 1-3, XP055265561, Retrieved from the internet: URL: http://www.fujitsu.com/global/about/resources/news/press-releases/2011/0719-02.html [retrived on Apr. 14, 2016] p. 1-p. 2.

(Continued)

*Primary Examiner* — Moustafa M Meky
(74) *Attorney, Agent, or Firm* — Fujitsu Patent Center

(57) ABSTRACT

A non-transitory computer-readable storage medium storing therein an application execution program for causing a computer to execute a process including: associating an external address outside of a terminal device with an application stored in a memory in the terminal device; booting an internal web server to which the external address is assigned, the internal web server being formed in the terminal device; causing a browser to access the internal web server at the external address and acquire the application stored in the memory; and causing the browser to execute the application and access data in a data storage region in the terminal device associated with the external address.

14 Claims, 18 Drawing Sheets

(51) Int. Cl.
   *G06F 9/445* (2018.01)
   *G06F 21/62* (2013.01)
   *G06F 21/12* (2013.01)
   *H04L 29/12* (2006.01)

(52) U.S. Cl.
   CPC .............. *G06F 21/62* (2013.01); *H04L 61/20* (2013.01); *H04L 67/02* (2013.01); *H04L 67/20* (2013.01); *H04L 67/26* (2013.01)

(56) References Cited

U.S. PATENT DOCUMENTS

| | | | |
|---|---|---|---|
| 2007/0033569 A1* | 2/2007 | Davidson | G06F 17/30902 717/103 |
| 2007/0143288 A1 | 6/2007 | Kichikawa et al. | |
| 2009/0031128 A1 | 1/2009 | French et al. | |
| 2009/0222674 A1 | 9/2009 | Leichsenring et al. | |
| 2010/0169407 A1* | 7/2010 | Hsueh | G06F 9/52 709/203 |
| 2010/0205274 A1 | 8/2010 | Gharabally et al. | |
| 2010/0235829 A1 | 9/2010 | Shukla et al. | |
| 2012/0072531 A1* | 3/2012 | Akuzawa | G06F 9/4401 709/217 |
| 2014/0095870 A1* | 4/2014 | Dewan | H04L 9/0866 713/167 |

FOREIGN PATENT DOCUMENTS

| | | |
|---|---|---|
| JP | 2010-160808 | 7/2010 |
| JP | 2010-182309 | 8/2010 |
| JP | 2010-534875 | 11/2010 |
| WO | 03/050662 | 6/2003 |
| WO | 2009/016070 | 2/2009 |
| WO | 2013/042411 | 3/2013 |

OTHER PUBLICATIONS

EESR—The Extended European Search Report of European Patent Application No. 13886076.2 dated Apr. 25, 2016.

Fujitsu Laboratories Ltd., "Fujitsu Develops Information Device Technology to Automatically Deliver and Run Applications Needed at Particular Time and Place", Jul. 19, 2011, (Aug. 7, 2012). http://pr.fujitsu.com/jp/news/2011/07/19-1.html <English ver.:http://www.fujitsu.com/global/about/resources/news/press-releases/2011/0719-02.html> (3 pages).

Eiji Sugawara, "Bokunimo Tsukureru Social Network no Sekai Zoku Windows Azure Jo ni Facebook Apuri o Kaihatsu shiyo!", G-Cloud Magazine 2011 Summer, Aug. 1, 2011, pp. 78 to 109, partial English Translation (pp. 85 and 87) (35 pages).

W3C, Web Storage, "W3C Proposed Recommendation Apr. 9, 2013" [online], Apr. 9, 2013, W3C, [retrieval date Jul. 29, 2013], Internet <URL: http://www.w3.org/TR/2013/PR-webstorage-20130409/> (21 pages).

International Search Report and Written Opinion of the International Searching Authority (Form PCT/ISA/210, Form PCT/ISA/237), mailed in connection with PCT/JP2013/064642 dated Aug. 6, 2013 (13 pages).

* cited by examiner

FIG. 14

DATA MANAGEMENT DB OF APPLICATION SERVER

TERMINAL 10-1
TERMINAL 10-2
TERMINAL 10-3

| APPLICATION | KEY NAME (DATA NAME: APPLICATION+SCENE) | SCENE (CONTEXT) | STORAGE STATE OF TERMINAL |
|---|---|---|---|
| APPLICATION 1 | KEY1 | PRIVATE | STORED |
| APPLICATION 1 | KEY2 | BUSINESS | STORED |
| APPLICATION 2 | KEY3 | PRIVATE | STORED |
| APPLICATION 2 | KEY4 | BUSINESS | ERASED |

DATA MANAGEMENT DB OF TERMINAL 10-1

| APPLICATION | KEY NAME (DATA NAME: APPLICATION+SCENE) | SCENE (CONTEXT) | STORAGE LOCATION INSIDE TERMINAL |
|---|---|---|---|
| APPLICATION 1 | KEY1 | PRIVATE | 001 |
| APPLICATION 1 | KEY2 | BUSINESS | 002 |
| APPLICATION 2 | KEY3 | PRIVATE | 003 |
| APPLICATION 2 | KEY4 | BUSINESS | --- |

FIG. 15

EXAMPLE OF POLICY FILE PF

IN THE CASE OF APPLICATION 1

PF1
SCENE: PRIVATE
KEY NAME: AP1+SC1
 (EXAMPLE: word-private_xxx.key)
SIGNATURE: hijklm PF2
SCENE: BUSINESS
KEY NAME: AP1+SC2
 (EXAMPLE: word-business_xxx.key)
SIGNATURE: opqrst

IN THE CASE OF APPLICATION 2

PF3
SCENE: PRIVATE
KEY NAME: AP2+SC1
 (EXAMPLE: exel-private_xxx.key)
SIGNATURE: vwxyz PF4
SCENE: BUSINESS
KEY NAME: AP2+SC2
 (EXAMPLE: exel-business_xxx.key)
SIGNATURE: abcde

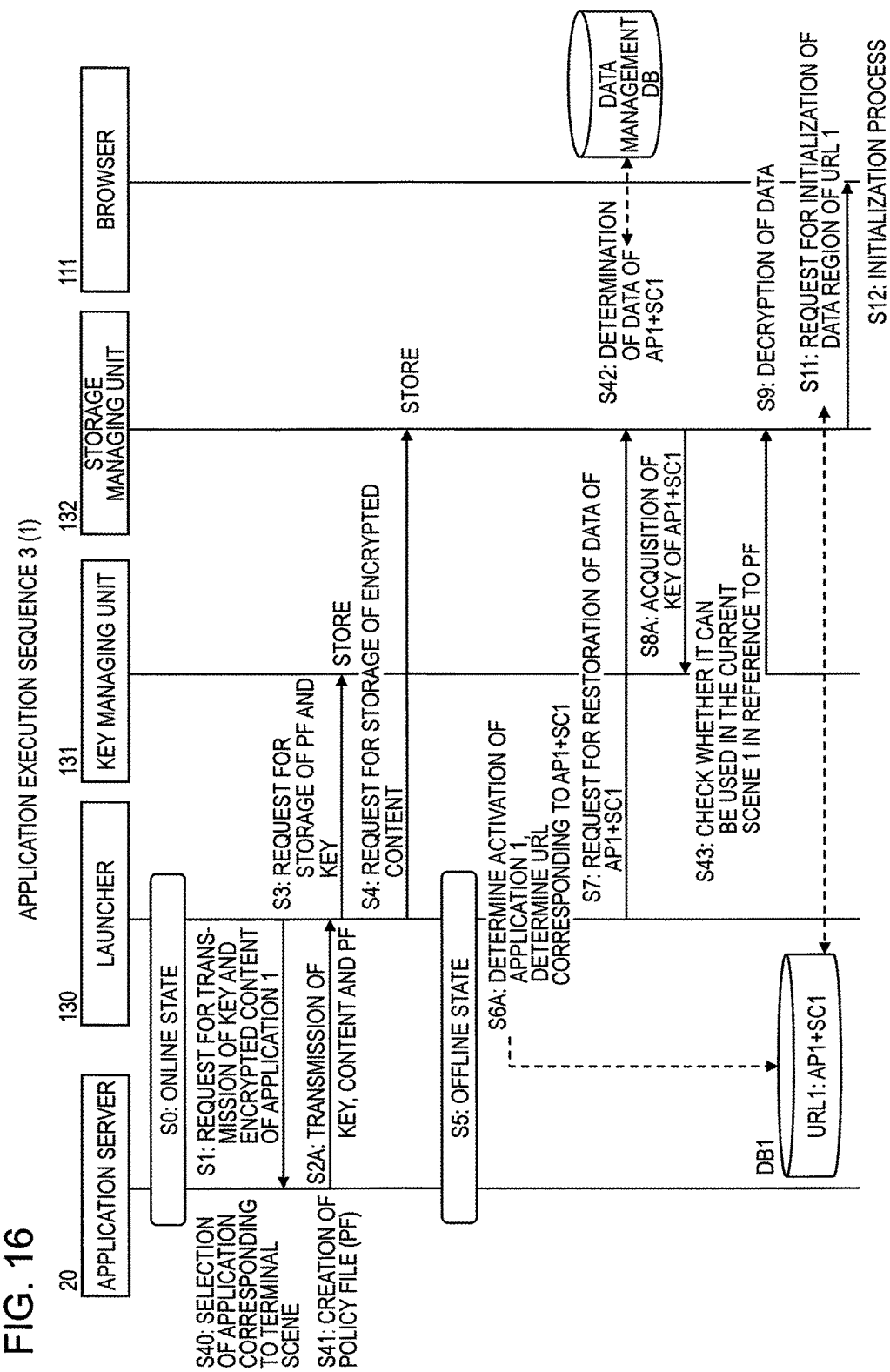

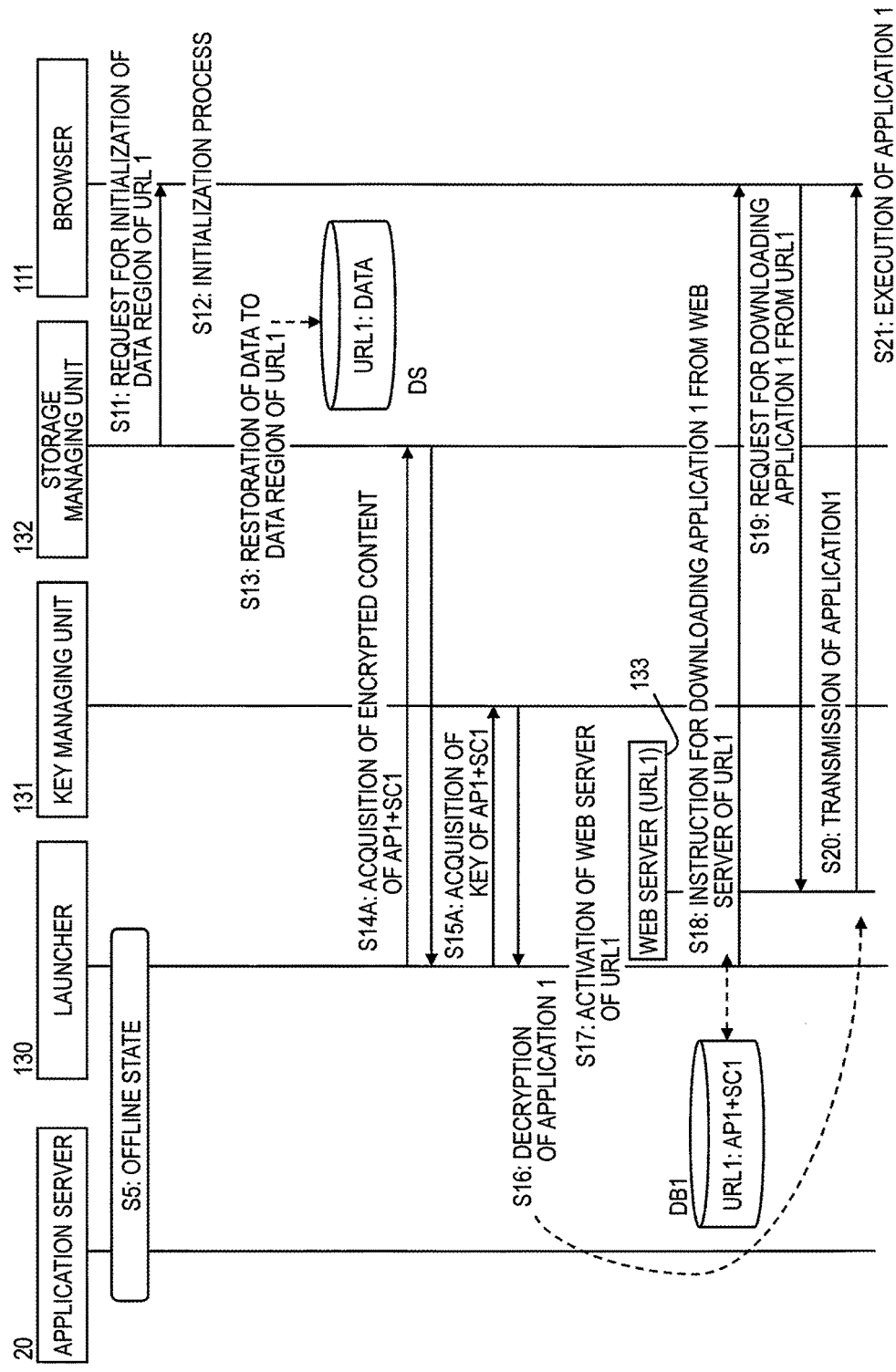

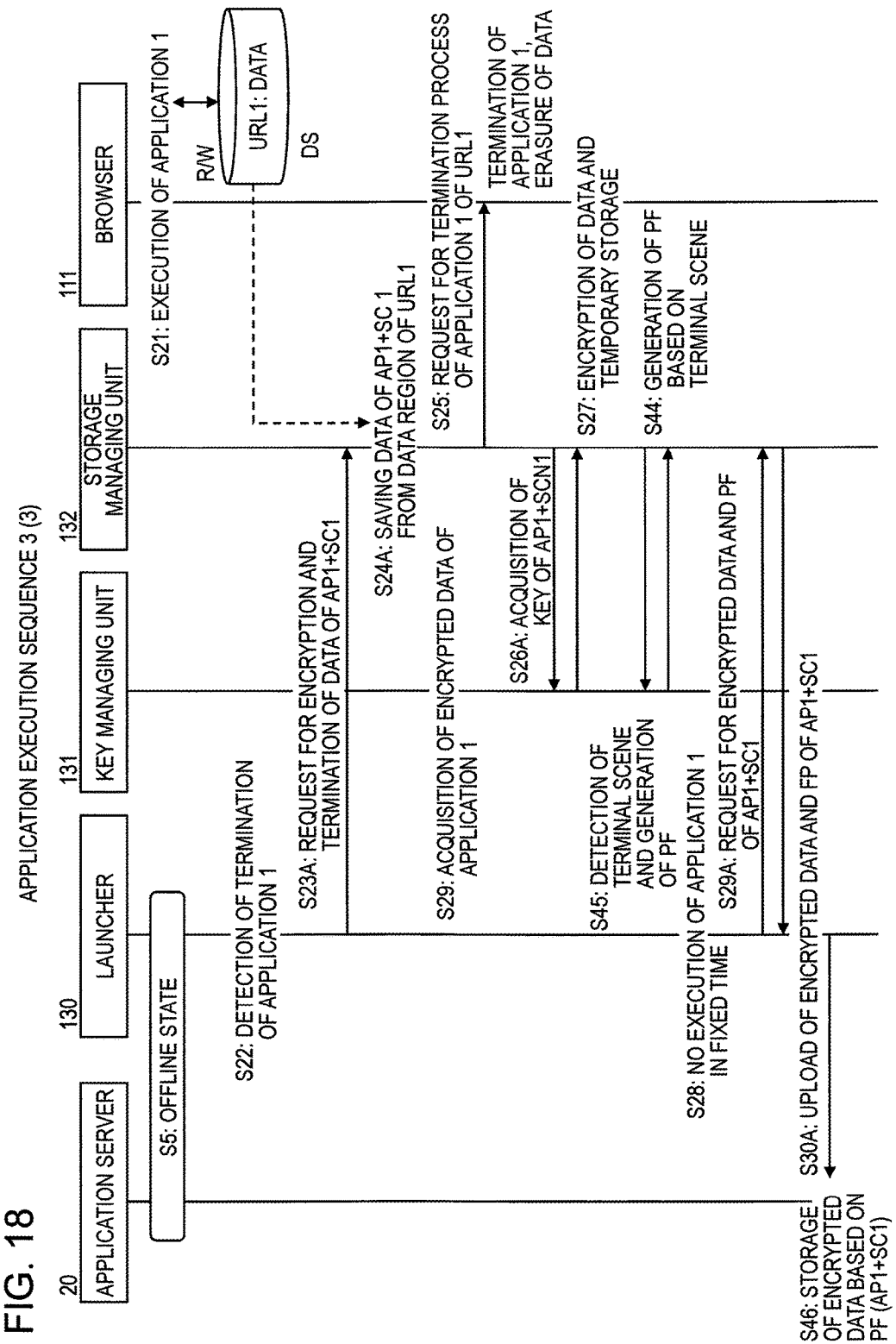

APPLICATION EXECUTION PROGRAM, APPLICATION EXECUTION METHOD, AND INFORMATION PROCESSING TERMINAL DEVICE THAT EXECUTES APPLICATION

CROSS-REFERENCE TO RELATED APPLICATION

This application is a continuation application of International Application No. PCT/JP2013/064642 filed on May 27, 2013 and designated the U.S., the entire contents of which are incorporated herein by reference.

FIELD

The present invention relates to an application execution program, an application execution method, and an information processing terminal device that executes an application.

BACKGROUND

With the increasing abundance of 3G/LTE (Long Term Evolution)/hotspots, environments are being set up where an information processing terminal device (hereinafter, simply referred to as a terminal or a terminal device) such as a smartphone can always be connected to a network.

An information processing system is proposed which, utilizing such an environment, distributes an application program (hereinafter, simply referred to as an application) from an application server to a terminal at an appropriate timing and causes the terminal to execute the application. In such a system, with respect to an application and data to be needed in accordance with a time and a place of a user carrying a terminal, a series of operations including distribution to the terminal, execution, and erasing is performed automatically. For example, a server acquires a state of the terminal from output of a sensor built into the terminal and distributes a needed application and data for the acquired state to the terminal. Once execution of the application is terminated at the terminal, the data is erased. By using this system, even if a user does not set up an application or data in a terminal in advance, a needed application can be executed by the terminal whenever and wherever needed at the desired time and place.

CITATION LIST

Patent Literature

Patent Literature 1: Japanese Laid-open Patent Publication No. 2010-182309
Patent Literature 2: Japanese Laid-open Patent Publication No. 2010-160808
Patent Literature 3: Japanese National Publication of International Patent Application No. 2010-534875
Patent Literature 4: International Publication Pamphlet No. WO 2003/050662

Non-Patent Literature

Non-Patent Literature 1: Press Release (technical), "Fujitsu Develops Information Device Technology to Automatically Deliver and Run Applications Needed at Particular Time and Place", Jul. 19, 2011, Fujitsu Limited (retrieved Aug. 7, 2012), http://pr.fujitsu.com/jp/news/2011/07/19-1.html The English website is as follows. http://www.fujitsu.com/global/about/resources/news/press-releases/2011/0719-02.html

SUMMARY

In an information processing system such as that described above, data security is an important technical issue. A terminal downloads a needed application and data from an application server in an online state and executes the application with respect to the data in an offline environment where the terminal is unable to connect to the application server. In addition, an HTML application that is an application program written in HTML is used as an application in such an information processing system.

When an HTML application is used in an online environment, storage regions for temporarily saving information are provided on the terminal. Since the storage regions are assigned to URLs that are Internet addresses by a browser and are isolated from one another, data in each storage region is protected. Data is stored only when a window or a tab is open and the data is lost once the window or the tab is closed. For example, there is a storage region referred to as a session storage. Therefore, data regarding different HTML applications are respectively saved in storage regions that are isolated from each other, and data in the storage regions are cleared as the HTML applications are terminated. An HTML application that is downloaded from a server and executed in an online environment as described above is referred to as a web application.

On the other hand, by storing an HTML application in a storage region inside a terminal (local terminal), the HTML application can be executed in an offline environment. In other words, so-called offline viewing can be performed. An HTML application which is saved in a local terminal and which is executed in an offline environment as described above is referred to as a local application. However, in this case, since the browser assigns a storage region of data to a same Internet address called a local file, all local HTML applications are to share the same storage region. Furthermore, even if an HTML application is terminated, data in the storage region is not cleared.

Therefore, in the case of a local application, there is a problem that data in the shared storage region is leaked by a malicious HTML application.

One aspect of the disclosure is a non-transitory computer-readable storage medium storing therein an application execution program for causing a computer to execute a process including: associating an external address outside of a terminal device with an application stored in a memory in the terminal device; booting an internal web server to which the external address is assigned, the internal web server being formed in the terminal device; causing a browser to access the internal web server at the external address and acquire the application stored in the memory; and causing the browser to execute the application and access data in a data storage region in the terminal device associated with the external address.

According to the aspect, security of data of an application can be increased.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating an example of a data management table retained by an application server and a data management table retained by each terminal device.

FIG. 15 is a diagram illustrating an example of a policy file PF created by the application server 20 and the key managing unit 131 in the terminal device 10.

FIG. 16 is a flow chart of an application execution sequence according to the third embodiment.

FIG. 17 is a flow chart of an application execution sequence according to the third embodiment.

FIG. 18 is a flow chart of an application execution sequence according to the third embodiment.

DESCRIPTION OF EMBODIMENTS

Figure 1:
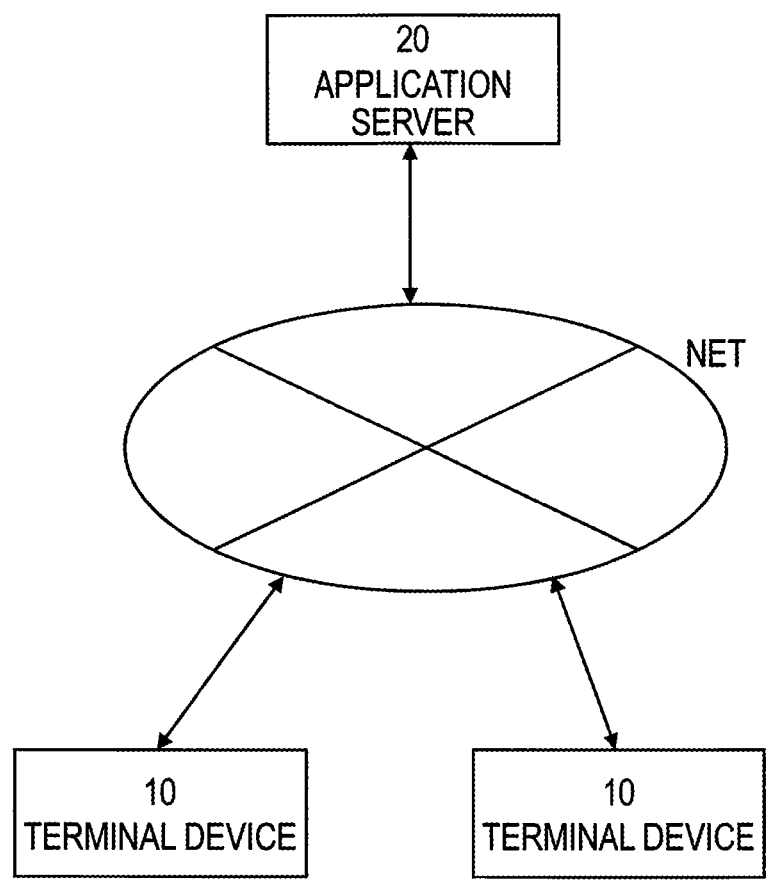
FIG. 1 is a diagram illustrating an overall configuration of an information processing system for an application push according to the present embodiment.

FIG. 1 is a diagram illustrating an overall configuration of an information processing system for an application push according to the present embodiment. The information processing system includes a plurality of terminal devices 10 that execute an application such as an HTML application (an application program written in HTML), an application server 20 that transmits the application to the terminal devices 10, and a network NET that enables the plurality of terminal devices 10 and the application server 20 to communicate with each other. The network NET includes an intranet of a company to which a user belongs, the Internet outside the company, a wireless LAN outside the company, and a public telephone line.

Schematic operations of the information processing system are as follows. The application server 20 stores data related to a schedule and a range of activities of a user owning each terminal device 10. Meanwhile, each terminal device 10 includes a GPS sensor that detects a position of the terminal device and a communication device that performs radio transmission. Accordingly, in an online state where communication can be performed with the application server 20, the terminal device 10 transmits positional information of the terminal device, an SSID (Service Set Identifier) that is an identifier of an access point for WiFi communication, an IP address, and the like to the application server 20.

In addition, based on various types of information transmitted from the terminal device 10, a stored schedule, and the like, the application server 20 transmits a needed application and data of the application to the terminal device 10 in accordance with a current state (hereinafter, may also be referred to as a scene) and a state (scene) in the near future of the terminal device. For example, the application server 20 performs a push transmission of a message including download destination information of the needed application such as a URL to the terminal device 10. As a result, based on the download destination information, the terminal device 10 downloads an application that is currently needed or that may be needed in the near future from the application server 20 and stores the downloaded application in an internal memory in the terminal device.

Subsequently, in an offline state, the terminal device 10 executes the application stored in the internal memory and updates data. When terminating the execution of the application, the terminal device 10 uploads the updated data stored in the internal memory to the application server 20 that is a secure storage system. When execution of the application is terminated, the terminal device 10 erases the updated data from the internal memory.

As described above, the terminal device 10 executes a needed application whenever and wherever needed and, once the data is no longer needed, erases data updated due to the execution of the application from inside the terminal device. Therefore, since a user can execute a business application or a private-use application while being offline and delete data generated due to the execution of the application from the terminal device even when outside at a customer's location that is outside of user's location, security with respect to data in the event of losing the terminal device can be increased.

Figure 2:
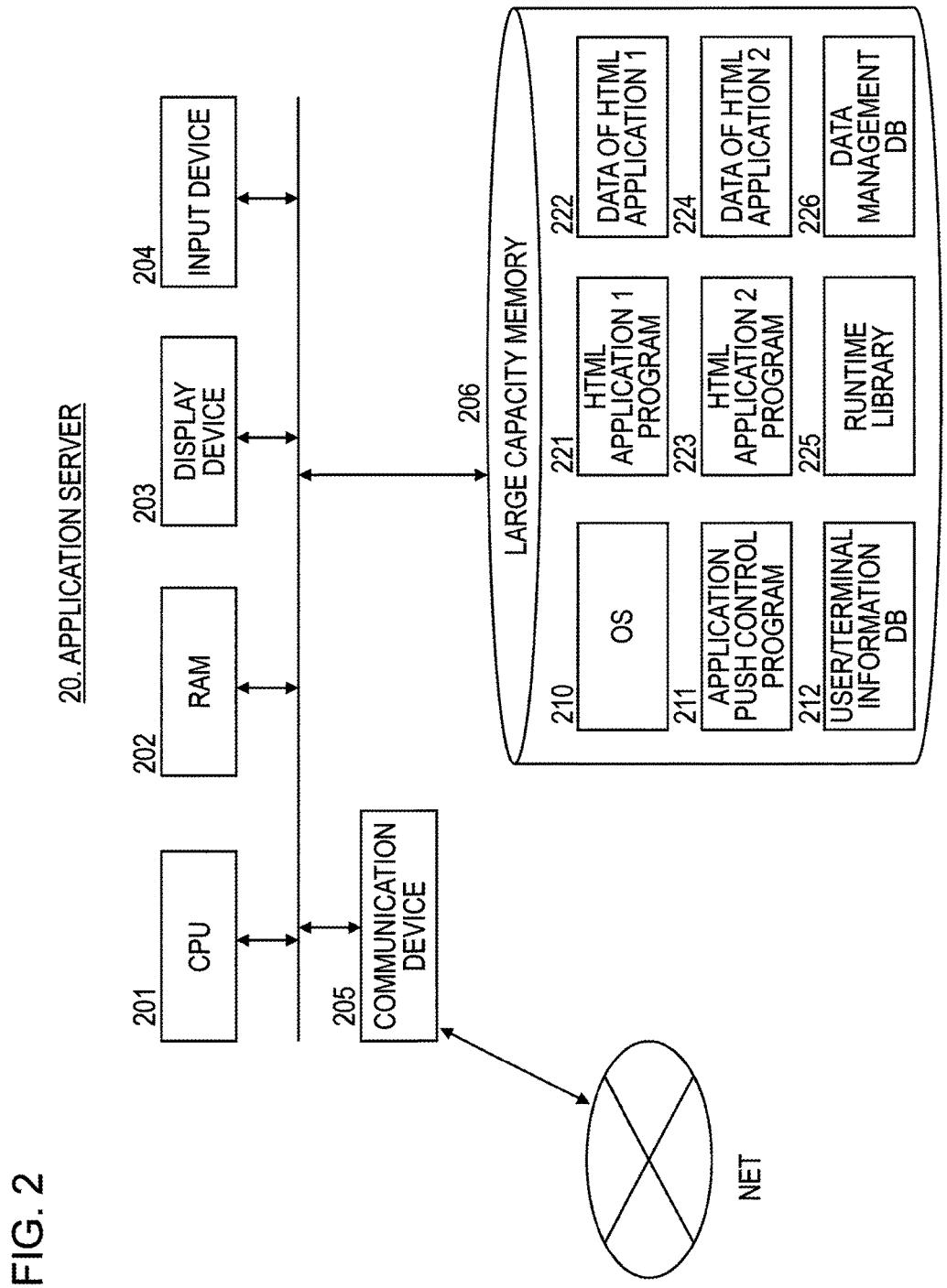
FIG. 2 is a configuration diagram of an application server according to the present embodiment.

FIG. 2 is a configuration diagram of an application server according to the present embodiment. The application server 20 includes a CPU 201, a RAM 202 that is a main memory, a display device 203, an input device 204, a communication device 205 that communicates with the outside via the network NET, and a large capacity memory 206 such as a hard disk or a flash memory.

An OS 210, an application push control program 211, and a user/terminal information database 212 that includes a user schedule and terminal information are stored in the large capacity memory 206. The large capacity memory 206 also stores HTML application programs 221 and 223 downloaded to the terminal device, data 222 and 224 of the programs 221 and 223, a runtime library 225 that executes the HTML applications, and a data management database 226 that stores, with respect to data corresponding to each HTML application, an encryption key shared between the application server 20 and the terminal device 10 and information indicating what scene of the terminal device the data corresponds to.

The HTML application is interpreted and executed by a runtime library and, in turn, the runtime library is interpreted and executed by the OS. Therefore, in order to transmit the HTML application to the terminal device and have the HTML application executed on the terminal device, a runtime library that executes the HTML application needs also to be transmitted to the terminal device. However, when a runtime library is already stored in the terminal device and is executable, a runtime library does not need to be transmitted to the terminal device.

Figure 3:
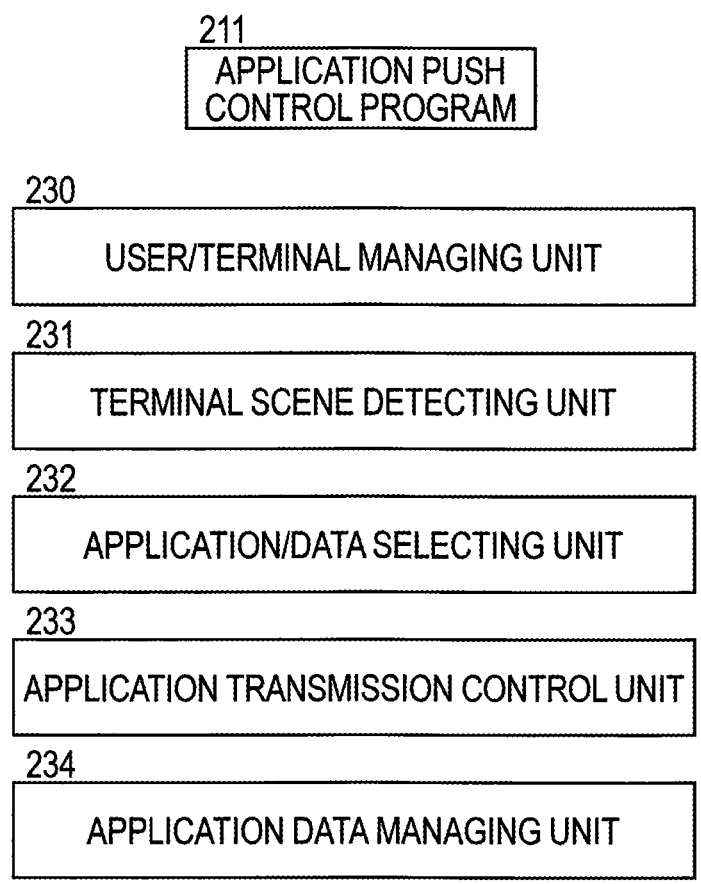
FIG. 3 is a diagram illustrating functions of the application push control program 211.

FIG. 3 is a diagram illustrating functions of the application push control program 211. Functions realized by executing the application push control program 211 include a user/terminal managing unit 230 that manages the user/terminal information DB 212 and a terminal scene detecting unit 231 that detects a current scene and a scene in the near future of the terminal device based on sensor values (positional information, an SSID, an IP address, and the like) uploaded from the terminal device, a user's schedule, and the like.

Furthermore, functions of the application push control program 211 include an application/data selecting unit 232 that determines which application and data are to be transmitted to the terminal device by a push transmission based on the detected scene of the terminal device, an application transmission control unit 233 that transmits the determined application and data, an encryption key thereof, and the like to the terminal device, and an application data managing unit 234 that manages the data management DB 226.

Figure 4:
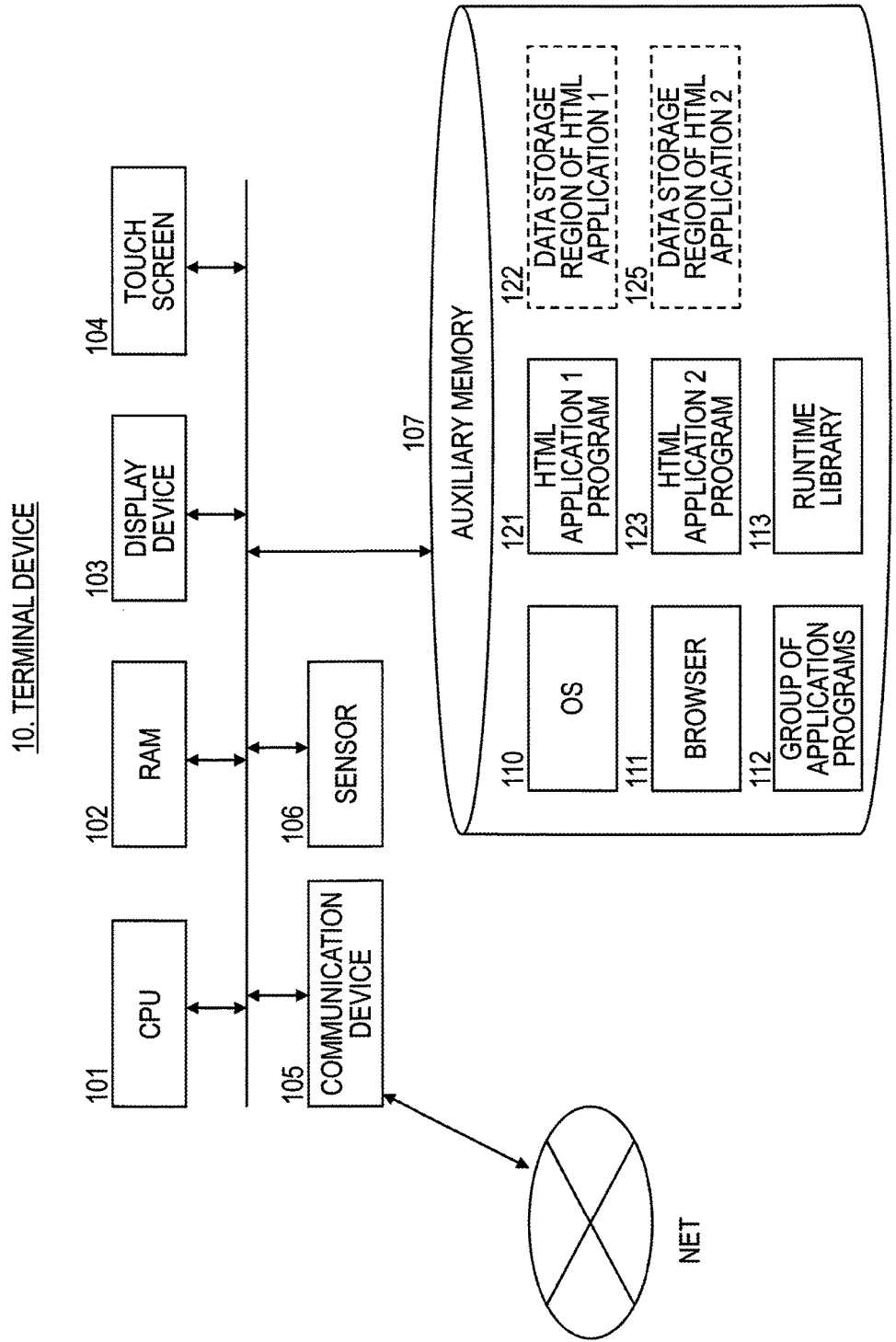
FIG. 4 is a configuration diagram of a terminal device according to the present embodiment.

FIG. 4 is a configuration diagram of a terminal device according to the present embodiment. The terminal device 10 illustrated in FIG. 4 is a smartphone, a tablet terminal, or the like. The terminal device 10 includes a CPU 101, a RAM 102 that is a main memory, a display device 103, a touch screen 104 for inputting operations, a communication device 105 that performs radio communication, and various sensors 106 such as a GPS that detect a position of the terminal device.

Furthermore, the terminal device 10 includes a large-capacity auxiliary memory 107 such as a hard disk (HDD) and an SSD including a flash memory. In addition, an OS 110, a browser 111, and a group of application programs 112 are stored in the auxiliary memory 107. Furthermore, HTML applications 121 and 123 downloaded from the application server 20 and a runtime library 113 that executes the applications are stored in the auxiliary memory 107. The auxiliary memory 107 includes data storage regions 122 and 124 for storing data of the HTML applications that are generated when activating the HTML applications.

Figure 5:
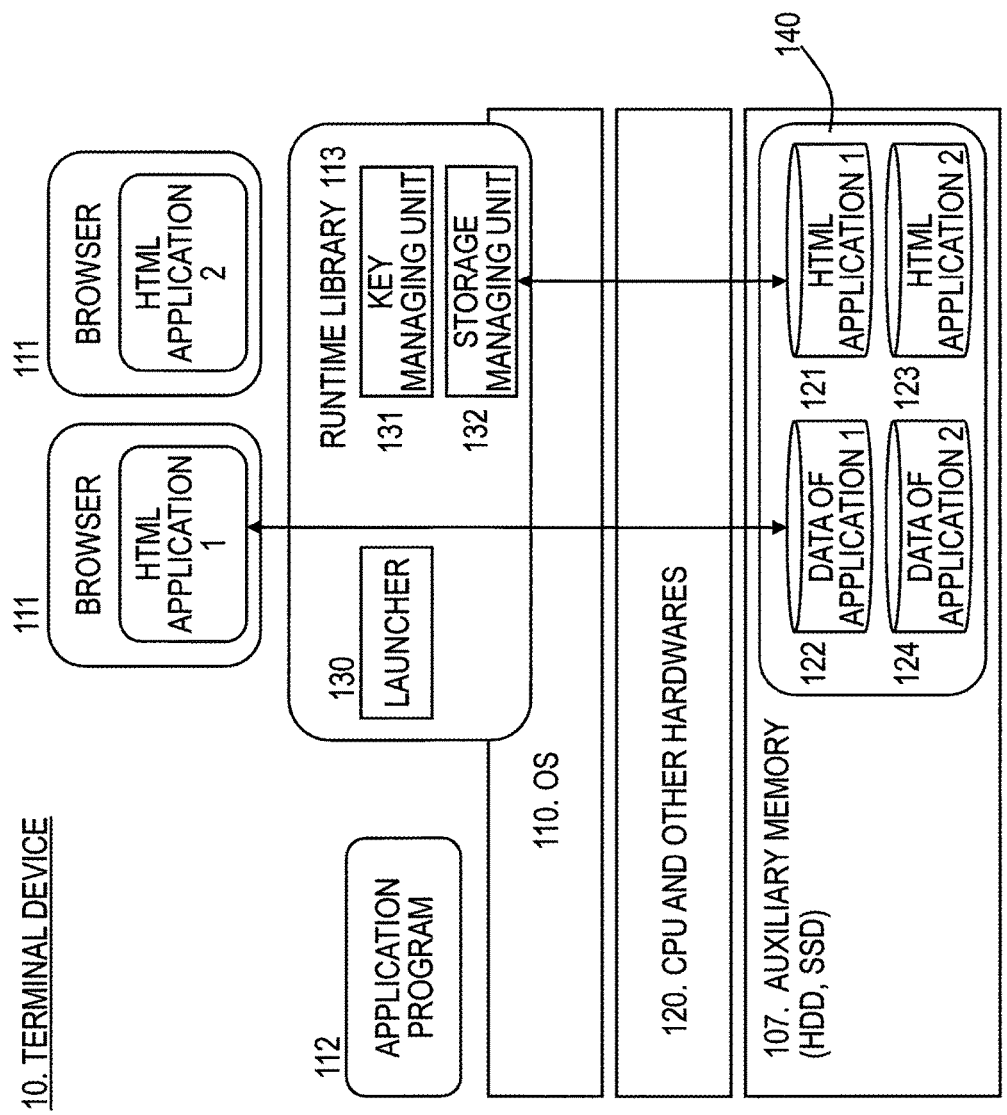
FIG. 5 is a diagram illustrating a relationship between hardware and software of the terminal device illustrated in FIG. 4.

FIG. 5 is a diagram illustrating a relationship between hardware and software of the terminal device illustrated in FIG. 4. In the terminal device 10, the OS 110 runs on a group of hardware 120 including the CPU 101, the RAM 102 and other hardware. In addition, the application program 112 stored in the auxiliary memory 107 is executed on the OS 110 to realize prescribed functions.

Meanwhile, the HTML applications 121 and 123 downloaded from the application server 20 by the browser 111 are stored in the auxiliary memory 107 that is a local memory inside the terminal device, by the runtime library 113. In addition, inside the auxiliary memory 107, a memory region 140 assigned to a runtime library is generated and is managed by a storage managing unit 132 of the runtime library 113.

The runtime library 113 includes a launcher 130 that activates and controls the HTML applications downloaded from the application server 20 via the browser 111, a key managing unit 131 that manages an encryption key, and the storage managing unit 132 that manages the memory region 140 assigned to the runtime library.

The downloaded HTML applications 121 and 123 are stored in the memory region 140 by the runtime library 113. In this case, the HTML application 121 is a first HTML application and the HTML application 123 is a second HTML application and these are HTML applications that differ from one another. When the launcher 130 activates the HTML applications inside the memory region 140, the data storage regions 122 and 124 for storing data of the activated HTML applications are secured in the memory region 140 and the downloaded data is stored in the data storage regions 122 and 124.

When the HTML applications 121 and 123 are executed by the browser 111 and the runtime library 113, reading and writing of data being executed are performed with respect to the data storage regions 122 and 124 that are associated with the respective HTML applications 121 and 123. In particular, as will be described later, when the HTML applications are downloaded from a web server, data is stored in data storage regions associated with a URL of the web server and the respective data storage regions are managed in isolation from each other.

First Embodiment

Figure 6:
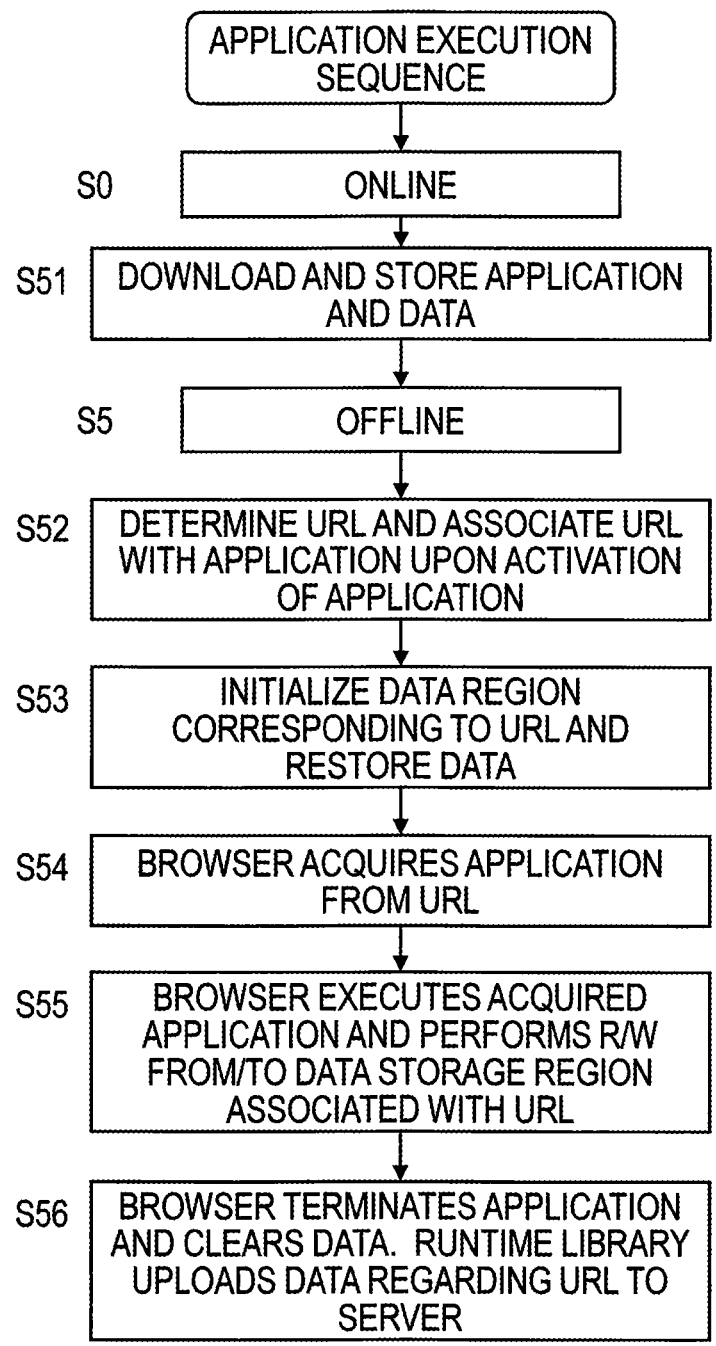
FIG. 6 is a flow chart illustrating an outline of an application execution sequence according to a first embodiment.

FIG. 6 is a flow chart illustrating an outline of an application execution sequence according to a first embodiment. After providing an outline of an application execution sequence with reference to FIG. 6, a detailed description will be given.

In FIG. 6, in an online state where the terminal device can communicate with an application server (S0), the terminal device 10 downloads a needed application and data thereof from the application server in accordance with a scene (for example, private or business) that is a state of the terminal device and respectively stores the application and the data in the auxiliary memory 107 (S51). In this case, when the application and the data thereof are encrypted, the terminal device 10 also downloads an encryption key.

In addition, when an application (web application) downloaded from the web server is executed in an online state, the browser secures a storage region corresponding to the URL of the web server, updates data and writes the data into the storage region during the execution of the application, and uploads the data in the storage region to the application server and deletes the data in the terminal device when the execution of the application is terminated. Execution of the application in an online state is not illustrated in FIG. 6.

In the present embodiment, an execution sequence will be described in which, in a subsequent offline state (S5), the terminal device 10 executes an application (local application) having been downloaded and stored in an internal auxiliary memory. When activating an application, the runtime library 113 determines a URL that is an unused external address in the terminal device and associates the URL with the application to be activated (S52). The association between the application to be activated and the URL is registered in a database and stored in the auxiliary memory 107.

In addition, the runtime library 113 performs an initialization process in which a data storage region corresponding to the URL is secured in the auxiliary memory, and writes data of the downloaded application into the data storage region and restores the data (S53).

Next, the runtime library 113 boots or activates a web server including a URL in the terminal, and instructs the browser 111 to download an application by specifying the URL and an address in the terminal where the application is stored. In response to the instruction, the browser accesses the URL and downloads the application from the internal web server (S54). As described above, by having the browser 111 access the web server having a URL that is a fake external address, the browser is controlled so as to download and execute a web application. As a result, the browser executes reading and writing operations of data of the application being executed with respect to the data storage region associated with the URL (S55). In addition, the browser isolates the data storage region in the memory region 140 and manages access thereto for each URL.

Finally, the browser terminates the application being executed and clears or deletes the data in the data storage region. In addition, the runtime library saves the data in the data storage region before the termination of the application and, after the application is terminated, uploads and stores the saved data in a high-security secure file system such as an application server (S56).

Subsequently, when an online state arrives once again, a push transmission of a message is performed from the application server 20 to the terminal device 10, and the terminal device 10 downloads encrypted content of a needed application and data thereof and an encryption key from the application server 20 and stores the encrypted content and the encryption key in an auxiliary memory that is an internal memory. Thereafter, in a similar manner to that described earlier, in an offline state, the browser executes the application stored in the internal memory as a web application.

As schematically described in the application execution sequence presented above, when an application stored in an auxiliary memory that is an internal memory of the terminal device, i.e. a local application, is activated, a URL that is an unused external address in the terminal device is selected and the browser is caused to access the URL and download the local application stored in the memory inside the terminal device. By downloading a local application from a URL that is a fake external address, the browser executes the local application as a web application. As a result, a data storage region generated in correspondence to the URL is managed in isolation from data storage regions associated with other applications. Therefore, data in the data storage region can be prevented from being stolen. In addition, when execution of an application is terminated, data in a data storage region corresponding to a URL of the application is deleted. Accordingly, since data updated by the application is not stored in the terminal device, security can be increased even when the terminal device is lost.

Details of First Embodiment

Figure 7:
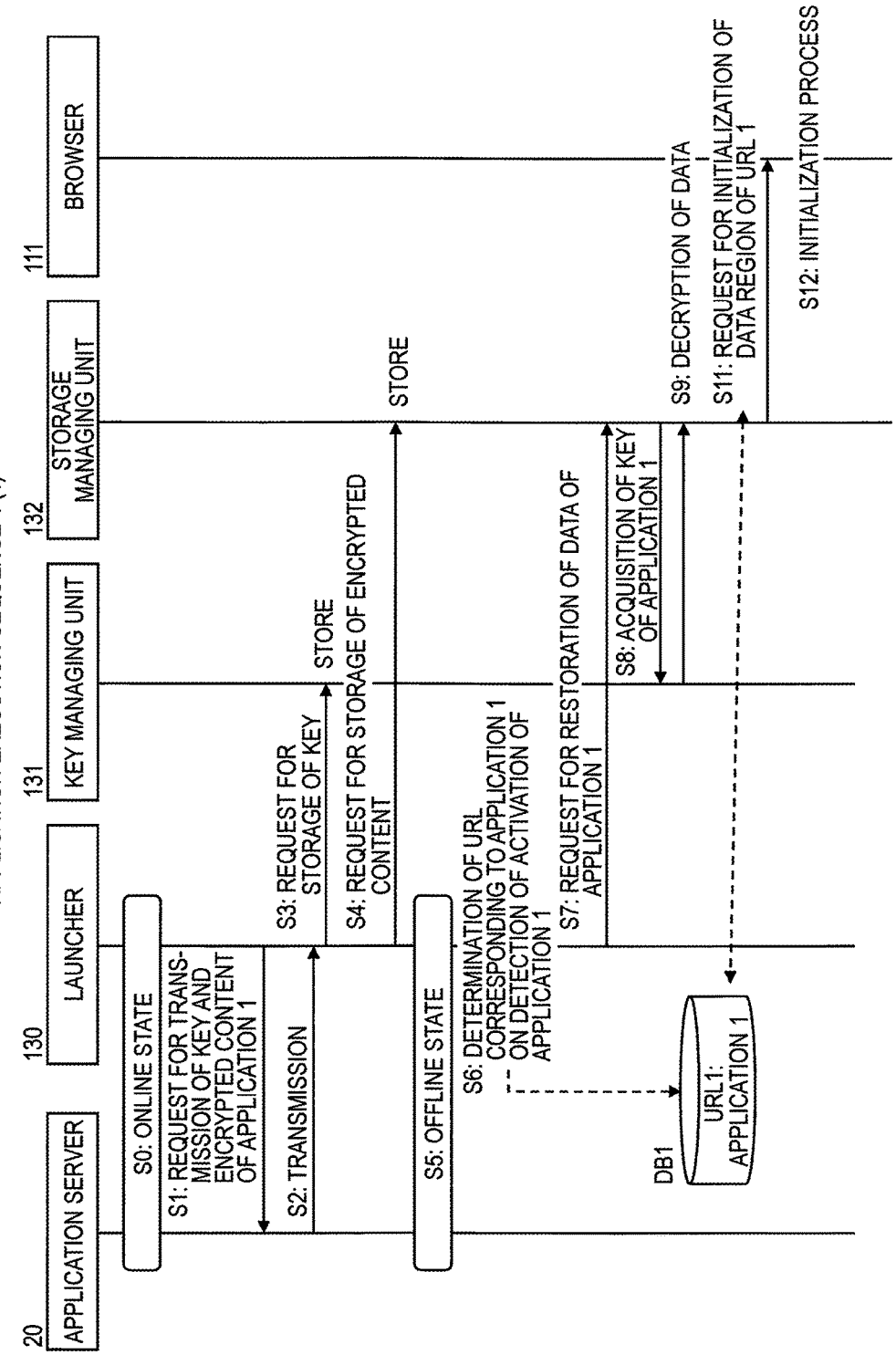
FIG. 7 is a flow chart of an application execution sequence according to the first embodiment.
Figure 8:
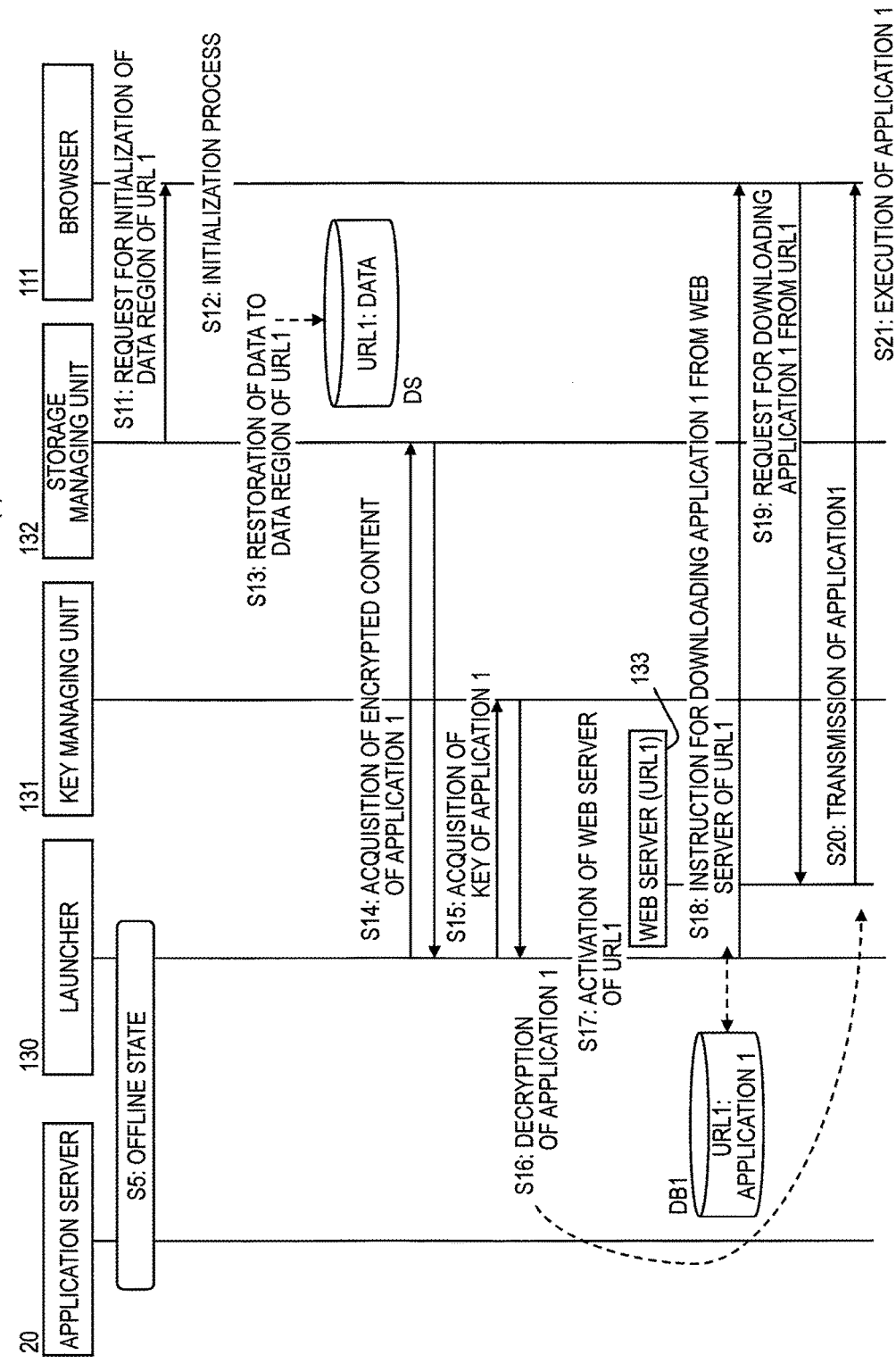
FIG. 8 is a flow chart of an application execution sequence according to the first embodiment.
Figure 9:
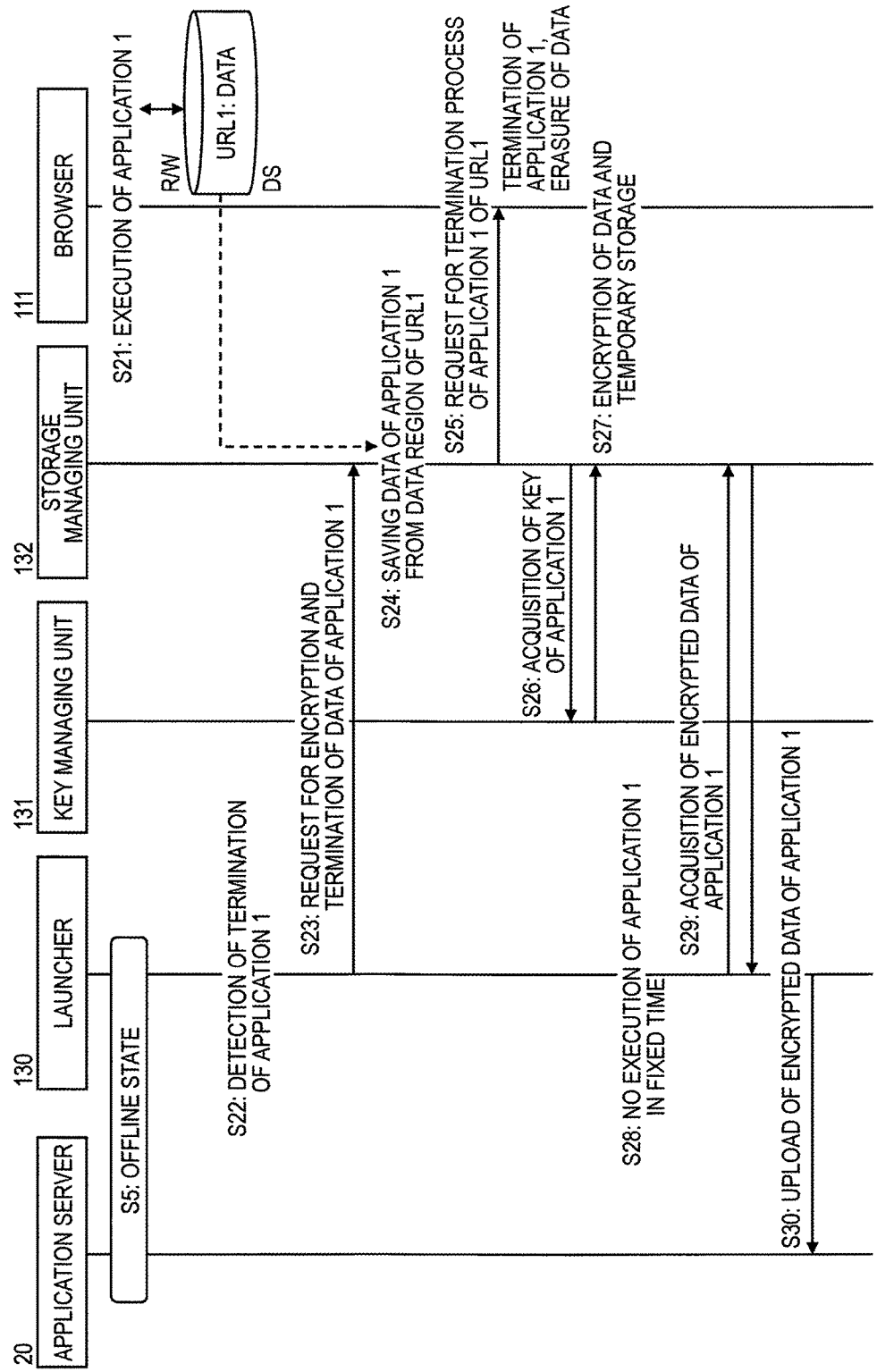
FIG. 9 is a flow chart of an application execution sequence according to the first embodiment.

FIGS. 7, 8, and 9 are flow charts of an application execution sequence according to the first embodiment.

As described earlier, as a premise, the application server 20 analogizes a current state and a scene (state) in the near future of the terminal device 10 based on various types of information for analogizing a scene of the terminal device 10 transmitted from the terminal device 10 such as positional information, an IP address, and an SSID, and on a schedule of a user of the terminal device 10 stored in the application server 20. Subsequently, the application server 20 transmits a needed application and data of the application in accordance with the scene of the terminal device 10 to the terminal device 10. For example, the application server 20 transmits a message (push message) including download destination information of the needed application such as a URL to the terminal device 10.

Refer to FIG. 7

In response to the transmission, the launcher 130 of the runtime library 113 of the terminal device 10 accesses the download destination information URL and requests the application server 20 to transmit encrypted content created by encrypting an application that is currently needed or that may be needed in the near future and data of the application as well as an encryption key (S1), and the application server 20 transmits the encrypted content and the encryption key to the terminal device 10 (S2). The encryption key may be encrypted by, for example, a shared key that is shared between the application server and the terminal device. In addition, the launcher 130 requests the key managing unit 131 to store the encryption key and the key managing unit 131 stores the encryption key in the auxiliary memory 107 (S3). Furthermore, the launcher 130 requests the storage managing unit 132 to store the encrypted content and the storage managing unit 132 stores the encrypted content in the auxiliary memory 107 (S4). Accordingly, in a subsequent offline state, the terminal device 10 enters a state where the application stored in the auxiliary memory 107 is executable.

Subsequently, the terminal device 10 enters an offline state in which the terminal device 10 is unable to communicate with the application server 20 (S5). In the offline state, by detecting an application activation event such as an activation operation of the application 1 by the user or by determining to activate the application 1 based on a current scene of the terminal device, the launcher 130 determines a URL that is an external address corresponding to the application 1 (S6). The external address is an unused address in the terminal device. In the following example, the external address URL is assumed to be a URL1. In addition, the launcher 130 stores a database DB1 in which the application 1 and the external address URL1 thereof are associated with each other in, for example, the auxiliary memory 107. For example, the URL1 assigned by the launcher 130 to the application 1 is an address such as the following.
http://171.0.0.1:5289/path/index.html Subsequently, the launcher 130 requests the storage managing unit 132 to restore the data of the application 1 (S7). In response to the request, the storage managing unit 132 acquires the encryption key of the application 1 from the key managing unit 131 and decrypts the encrypted content of data of the application 1 stored in the auxiliary memory 107 using the encryption key (S9). Furthermore, the storage managing unit 132 refers to the database DB1 including the association between the application 1 and the external address URL1 thereof and requests the browser 111 to perform an initialization process of securing a data storage region associated with the URL1 (S11), and the browser secures the data storage region associated with the URL1 in the auxiliary memory 107 (S12).

Refer to FIG. 8

When the browser 111 initializes the data storage region associated with the URL1 (S12), the storage managing unit 132 writes the decrypted data of the application 1 to the initialized data storage region DS to restore the data (S13). In other words, since the browser 111 later executes the application 1 that is a local application as a web application, decrypted data of the application 1 needs to be written into the data storage region DS in advance.

Next, the launcher 130 acquires the encrypted content of the application 1 from the storage managing unit 132 (S14), and further acquires the encryption key of the application 1 from the key managing unit 131 (S15). The launcher 130 then decrypts the application 1 using the encryption key (S16). The decrypted application 1 is stored in any region in the terminal device.

Subsequently, the launcher 130 boots a web server 133 of the URL1 (S17) and instructs the browser 111 to download the application 1 from the web server 133 of the URL1 (S18). The download instruction includes the URL1 and region information, i.e. address, of a region in the terminal device where the application 1 is stored. In response to the instruction, the browser 111 accesses the web server of the URL1 and requests the web server to download the application 1 (S19). In response to the request, the web server 133 transmits the decrypted application 1 to the browser 111 (S20) and the browser 111 executes the downloaded application 1 as a web application (S21).

Refer to FIG. 9

The browser 111 searches for, at the accessed URL1, the data storage region DS associated with the URL1 and, once the data storage region DS is detected, accesses data inside the data storage region DS during the execution of the application 1 and performs a read process of the data and a write process of data updated by the execution of the application. When a data storage region DS is not detected by the search, the browser 111 initializes a data storage region with respect to the URL1 and executes the application 1.

The web server 133 described above is provided inside the terminal device and is capable of communicating with a browser using HTTP protocol. Therefore, when the browser 111 accesses the URL1, the browser 111 is activated and enters a connected state with the web server 133 and can download the application 1 stored in the region of the region information in the terminal device specified by the browser 111. Accordingly, the browser 111 is caused to recognize a local application stored in the terminal device as a web application downloaded from an external web server on the Internet and executes read and write operations of data with respect to the data storage region DS secured in correspondence with the URL1. Writing data to the storage region DS corresponding to the URL1 is an operation that is also defined in, for example, the HTML5 standard.

After execution of the application 1, the launcher 130 detects termination of the application 1 (S22). The storage managing unit 132 is requested to encrypt data of the application 1 and to terminate the execution of the application 1 by the launcher (S23). In response to the request, the storage managing unit 132 first saves (reads and temporarily stores) data of the application 1 from the data storage region DS associated with the URL1 (S24). In addition, when the storage managing unit 132 issues a request for a termination process of the application 1 to the browser 111 (S25), the browser 111 terminates the application 1 and erases data in the storage region DS of the URL1 which is associated with the application 1. Since the browser 111 recognizes the termination of a web application, the browser 111 terminates the application 1 and, at the same time, erases data in the storage region DS of the URL1 as described above.

The storage managing unit 132 acquires an encryption key of the application 1 from the key managing unit 131 and encrypts and temporarily stores the saved data of the application 1 (S27). Subsequently, when the application 1 is not executed for a certain period of time, the launcher 130 acquires encrypted data of the application 1 from the storage managing unit 132 (S29) and uploads the data to the application server 20 that is a more secure file system (S30). The secure file system may be a file system other than the application server 20.

As described above, by having the browser 111 access the URL1 and download the application 1 in a state where the launcher 130 has booted or activated the web server 133 of the URL1, the browser 111 recognizes the application 1 that is a local application as a web application, executes reading and writing of data to/from a data storage region DS corresponding to the URL1, restricts access to the data storage region DS by other applications, and erases data in the data storage region DS upon termination of the application 1. In addition, the launcher 130 saves data in the data storage region DS upon termination of the application 1 and encrypts and uploads the data to the application server 20 that is a secure file system at an appropriate timing.

Therefore, even if the terminal device is lost, since data updated by the application 1 has been erased from the terminal device and the data storage region DS associated with the application 1 is managed in isolation from data storage regions associated with other applications, security with respect to data can be increased.

Second Embodiment

In the first embodiment, during execution of the application 1, updated data is written into a data storage region associated with the URL1 without being encrypted. In contrast thereto, in an application execution sequence according to a second embodiment, during execution of the application 1, updated data is encrypted and stored in real time into a data storage region associated with the URL1. To this end, an encryption/decryption read/write function for performing a process of decrypting read data and encrypting and writing write data may be registered when execution of the application 1 is started, and read/write processes from/to the data storage region associated with the URL1 during execution of the application 1 may be performed using the encryption/decryption read/write function.

Figure 10:
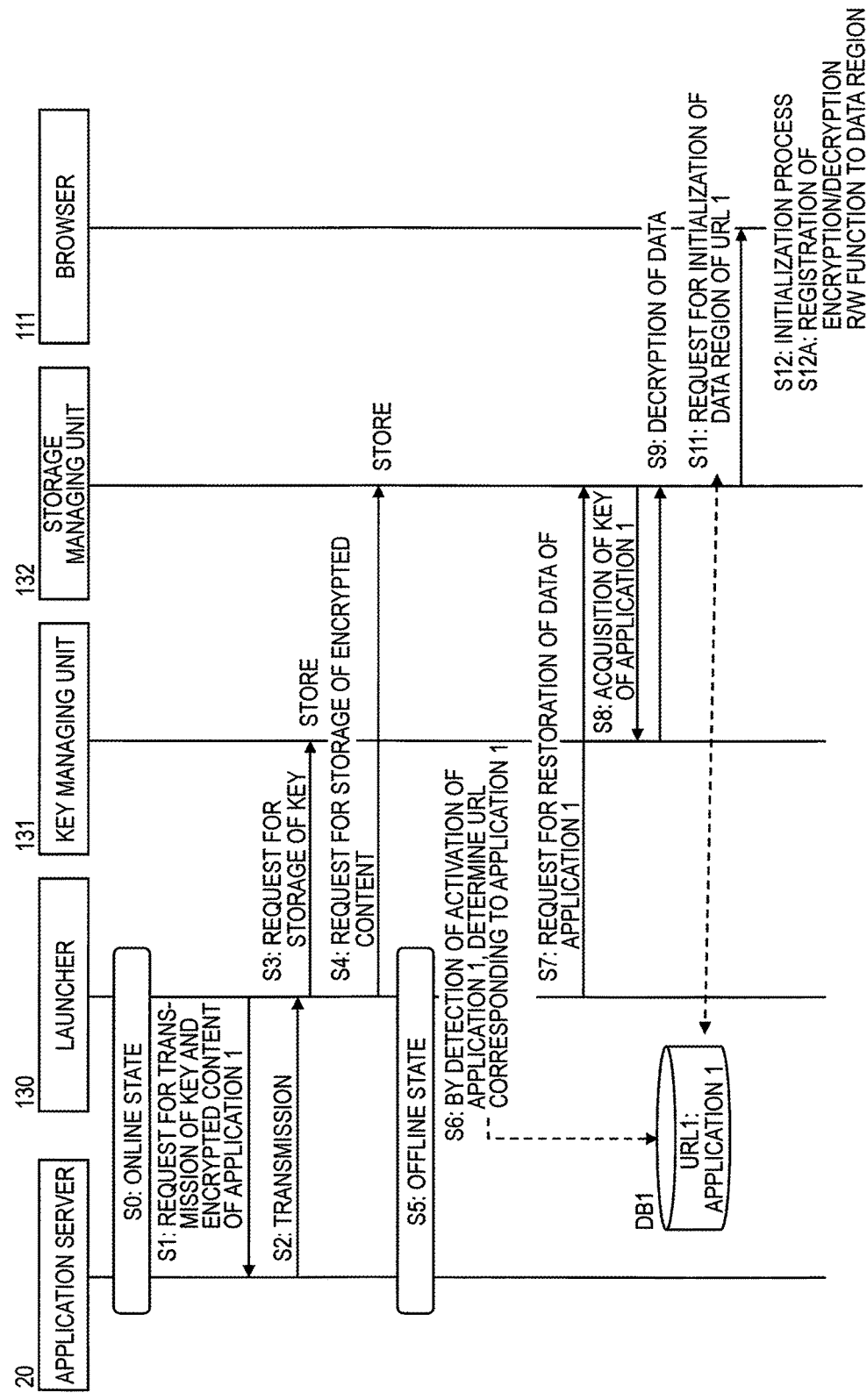
FIG. 10 is a flow chart representing an application execution sequence according to the second embodiment.
Figure 11:
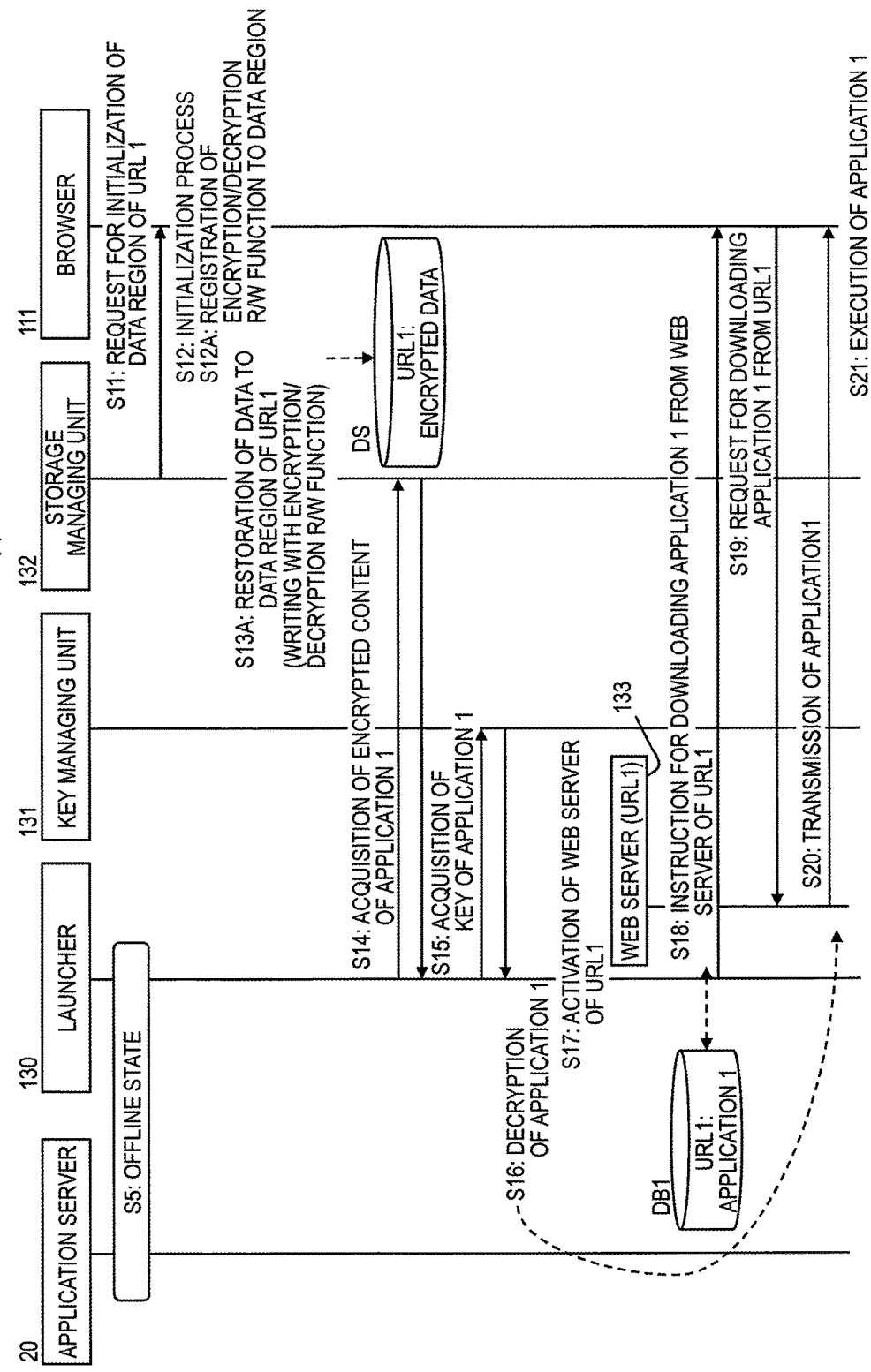
FIG. 11 is a flow chart representing an application execution sequence according to the second embodiment.
Figure 12:
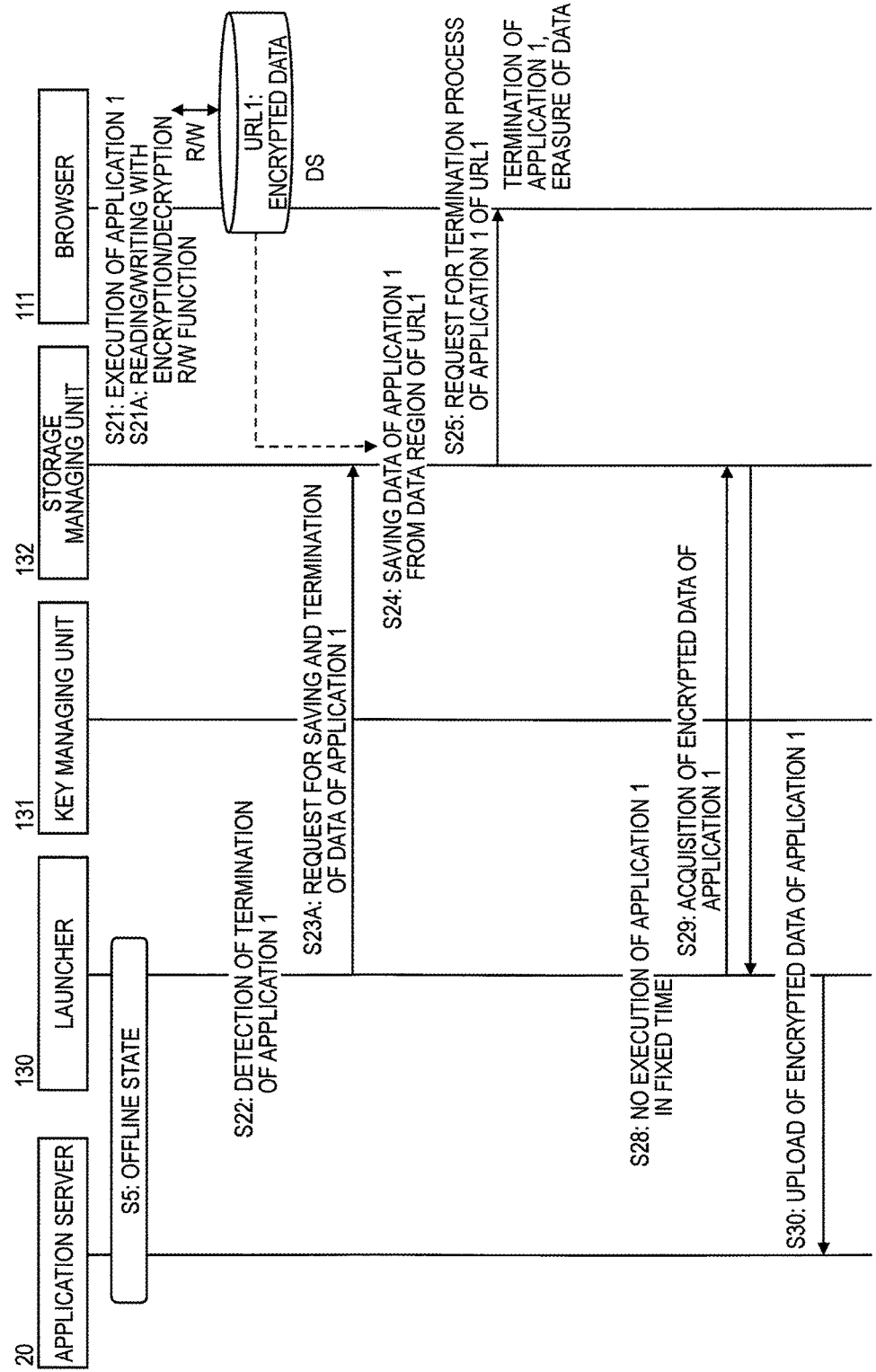
FIG. 12 is a flow chart representing an application execution sequence according to the second embodiment.

FIGS. 10, 11, and 12 are flow charts representing an application execution sequence according to the second embodiment. Hereinafter, processes that differ from the application execution sequence illustrated in FIGS. 7, 8, and 9 will be mainly described.

Refer to FIG. 10

Processes S1 to S4 in the online state S0 are the same as in FIG. 7. In addition, processes S6 to S11 in the offline state S5 are also the same as in FIG. 7.

Furthermore, in response to an initialization request with respect to a data storage region corresponding to the URL1 from the storage managing unit 132, the browser 111 performs an initialization process of securing a data storage region corresponding to the URL1 in the auxiliary memory 107 (S12), and the browser 111 further registers an encryption/decryption read/write function with respect to the data storage region corresponding to the URL1 in a read/write function table in a browser engine (S12A).

Figure 13:
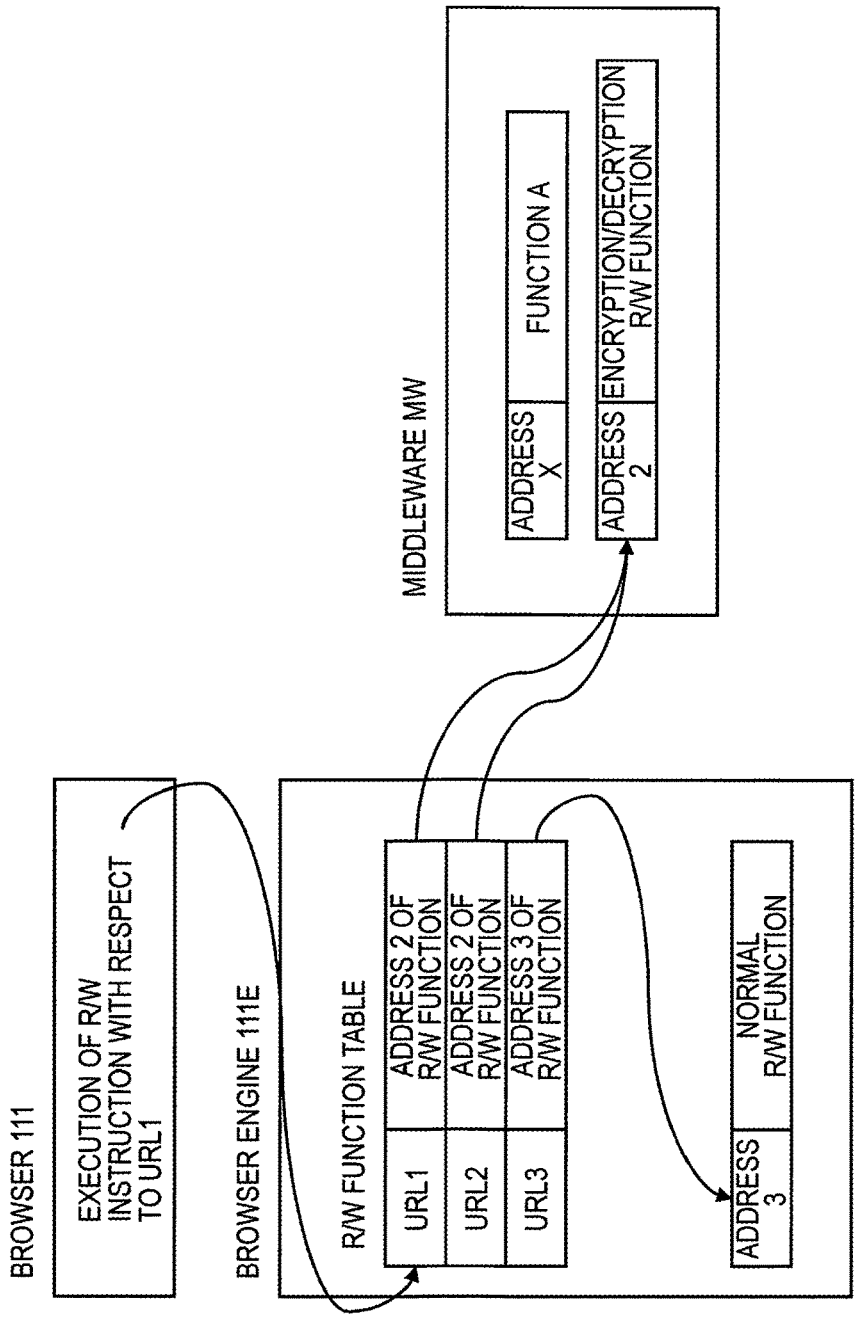
FIG. 13 is a diagram illustrating a read/write function table in a browser engine.

FIG. 13 is a diagram illustrating a read/write function table in a browser engine. When the browser 111 executes a read/write instruction with respect to the URL1, processing of the read/write instruction is performed by referring to an address 2 of an R/W function corresponding to the URL1 in the read/write (R/W) function table in a browser engine 111E and calling the encryption/decryption (R/W) function corresponding to the address 2 in middleware MW as a call back function. The encryption/decryption (R/W) function corresponding to the address 2 is a type of an API (Application Program Interface).

Moreover, in FIG. 13, an encryption/decryption read/write (R/W) function corresponding to the address 2 is registered so as to be called also with respect to a read/write instruction from/to a URL2. In addition, when a normal read/write instruction from/to a data region with respect to a URL3 is executed by the browser 111, a normal read/write function registered at an address 3 in the browser engine 111E is called.

Refer to FIG. 11

The storage managing unit 132 restores the decrypted data in the data storage region SD associated with the initialized URL1 (S13A). The restoration process is a write process of data to the data storage region SD of the URL1. A registered encryption/decryption read/write function is called, and decrypted data is encrypted by the function and written into the data storage region SD associated with the URL1.

Refer to FIG. 12

When the browser 111 executes the application 1 (S21), a read/write process of data being executed is performed by the registered encryption/decryption read/write function (S21A). Therefore, updated data is encrypted by the encryption/decryption read/write function and written into the data storage region SD, and data read from the data storage region SD is decrypted. Accordingly, access by the browser 111 to data during execution of the application 1 is executed by calling the function, and data is encrypted in real time and written into the data storage region SD associated with the URL1.

In addition, upon termination of the application 1, a process by the storage managing unit 132 of encrypting data in the data storage region SD is no longer needed as illustrated in FIG. 9. Therefore, in FIG. 12, when the launcher 130 detects termination of the application 1 (S22), the launcher 130 requests the storage managing unit 132 to save data of the application 1 and terminate the application 1 (S23A). In response to the request, the storage managing unit 132 simply saves already-encrypted data of the application 1 from a data storage region associated with the URL1 and does not need to perform another encryption process. In addition, when the application 1 is not executed for a certain period of time, the launcher 130 acquires the saved encrypted data from the storage managing unit 132 and uploads the acquired data to the application server 20 (S30).

As described above, by registering an encryption/decryption read/write function for exclusively performing a read/write process from/to the data storage region SD corresponding to the URL1 in the browser engine 111E, when the browser 111 executes an access process of data of the application 1 of the URL1, the registered function is hooked and called. Therefore, data can be encrypted and stored inside the data storage region SD in real time. Accordingly, even when the terminal device 10 is lost in an offline state, data is prevented from being stolen during execution of the application and security of data can be increased.

Third Embodiment

In a third embodiment, data of an HTML application is distinguished and managed in accordance with a state of the terminal device 10, in other words, in accordance with a state (scene) such as private and business. In order to do so, the application server 20 and the terminal device 10 share a data management DB that includes information on an application, data, a scene of the data, and an encryption key for the data of the application at the scene. In addition, in an online state, the application server 20 detects a scene of the terminal device 10 and transmits, to the terminal device 10, a policy file describing an application, data, and an encryption key corresponding to the detected scene as well as use conditions of the application and data. The application server 20 creates a policy file for each application and scene by referring to the data management DB.

Furthermore, in an offline state, when activating a downloaded application and data, the key managing unit in the terminal device 10 refers to the policy file and confirms whether or not use of the application and data to be activated is permitted by an application server. Accordingly, a third party having illegally acquired the terminal device can be prevented from causing a sensor of the terminal device to detect a false scene state (for example, a business scene state despite being in a private scene state) and attempting to illegally use an application and data (business data) stored in an internal memory.

In addition, upon termination of the application, the key managing unit once again detects a current scene, creates a policy file including information regarding which scene of which application the uploaded data is to be stored with, and uploads both encrypted data and the policy file to the application server 20. The application server 20 can store an application and data with respect to a correct scene by referring to the policy file.

FIG. 14 is a diagram illustrating an example of a data management table retained by an application server and a data management table retained by each terminal device. As illustrated in FIG. 14, the application server retains a data management DB for every one of terminals 10-1, 10-2, and 10-3. The data management DB with respect to the terminal 10-1 includes, with respect to the application 1, a key name KEY1 in a case where a scene of the terminal is private, a key name KEY2 in a case where a scene of the terminal is business, and information on a storage state inside the terminal in each case. The key name KEY1 is also, for example, a data name including an application name and a scene. In a similar manner, the data management DB with respect to the terminal 10-1 also includes, with respect to the application 2, a key name KEY3 in a case where a scene of the terminal is private and a key name KEY4 in a case where a scene of the terminal is business.

For example, when the application is Word (Word is a registered trademark) and the data corresponds to a private scene, the key name described above may be word-private_xxx.key or the like. A key name includes information of an application name and a scene.

Meanwhile, each terminal device retains a data management DB of data stored in each terminal device. In the example illustrated in FIG. 14, the data management DB retained by the terminal device 10-1 has an application name, a key name, and a scene which are consistent with those of the data management DB retained by the application server with respect to the terminal device 10-1. However, the data management DB retained by the terminal device 10-1 includes data regarding a storage location inside the terminal.

As illustrated in FIG. 14, the application server and the terminal device share key information with respect to a particular scene of a particular application. Accordingly, encryption and decryption of data can be performed only between the application server and the terminal device.

FIG. 15 is a diagram illustrating an example of a policy file PF created by the application server 20 and the key managing unit 131 in the terminal device 10. As policy files with respect to the application 1, a policy file PF1 that is attached to data when a scene of a terminal is private and a policy file PF2 that is attached to data when a scene of a terminal is business are generated. A key name of the policy file PF1 is word-private_xxx.key which includes information on the application 1 and a scene 1, and a signature hijklm is added. A key name of the policy file PF2 is word-business_xxx.key which includes information on the application 1 and a scene 2, and a signature opqrst is added. In addition, a key name of a policy file PF3 is exel-private_xxx.key which includes information on the application 2 and the scene 1, and a signature uwxyz is added. A key name of the policy file PF4 is exel-business_xxx.key which includes information on the application 2 and the scene 2, and a signature abcde is added.

When downloading an application and data of the application from the application server 20, the terminal device 10 also downloads a policy file describing use conditions (an application and a scene) thereof. In addition, when a scene of the terminal is detected in an offline state, an application is activated and data regarding the scene is used. In doing so, the key managing unit 131 of the terminal device 10 refers to the policy file PF and checks whether or not the data is data with respect to a particular scene of a particular application permitted to be used in an online state by the application server 20. Therefore, when a malicious third party illegally places the terminal device at a scene corresponding to data which the third party intends to steal, use of the data is not permitted due to the scene being different and security with respect to data can be increased.

In addition, when terminating an application, the terminal device 10 causes the key managing unit 131 to detect a scene of the terminal device and generate a policy file PF, adds the policy file PF to saved encrypted data, and uploads the data and the policy file PF to a secure file system such as an application server. Accordingly, the application server can detect which scene of which application the data is associated with from the policy file and can update the data as data associated with a correct scene.

FIGS. 16, 17, and 18 are flow charts of an application execution sequence according to the third embodiment. Hereinafter, processes that differ from the application execution sequence illustrated in FIGS. 7, 8, and 9 will be mainly described.

Refer to FIG. 16

In an online state S0, the application server 20 acquires sensor information corresponding to a scene of a terminal from the terminal device, refers to schedule information or the like of a user of the terminal device, and selects an application corresponding to a current scene and a scene in the near future of the terminal device and data of the application (S40). In addition, the application server 20 refers to the data management DB illustrated in FIG. 14 and creates a policy file for each piece of data illustrated in FIG. 15 (S41).

Furthermore, the application server 20 performs a push transmission to the terminal 10 (S2A) of a message which, for example, requests that the selected application corresponding to a current scene and a scene in the near future and data thereof be downloaded. In response to the request, the launcher 130 of the terminal device accesses a URL of an application server described in the message transmitted by push transmission and requests transmission of a key and encrypted content of the application requested to be downloaded (S1). In response to the request, the application server 20 transmits an encryption key, encrypted content (an application and data thereof), and a policy file PF to the terminal device 10. In addition, the launcher 130 causes the key managing unit 131 to store the encryption key and the policy file PF in the auxiliary memory 107 (S3) and causes the storage managing unit 132 to store the encrypted content in the auxiliary memory 107 (S4).

Subsequently, in an offline state S5, the launcher 130 determines activation of the application 1 from the current scene 1 of the terminal, determines a URL1 corresponding to the application 1 and the scene 1 (hereinafter, AP1+SC1), and stores a database DB1 in which the application 1 and the scene 1 (AP1+SC1) and an external address URL thereof are associated with each other in, for example, the auxiliary memory 107 (S6A). In addition, the launcher 130 requests the storage managing unit 132 to restore data corresponding to the application 1 and the scene 1 (AP1+SC1) (S7A).

The storage managing unit 132 refers to the data management DB to detect data of the application 1 and the scene 1 (AP1+SC1) (S42) and makes a request to the key managing unit 131 for an encryption key corresponding to the key name (S8A). In response to the request, the key managing unit 131 refers to the policy file PF and checks whether data of the application 1 can be used in the current scene 1 of the terminal (S43). In the event that a malicious third party having acquired a terminal device controls the terminal device in a state which differs from an actual scene and attempts to access data of the application 1 and the scene 1 (for example, business), if the policy file PF created by the application server 20 does not permit use of data of the application 1 and the scene 1 in an online state, illegal access to the data can be suppressed. When it is determined by referring to the policy file PF that use of data is not able to be permitted, the key managing unit 131 may request the user to input authentication information in order to obtain permission to use the data.

When permitting the use of data of the application 1 and the scene 1 (AP1+SC1), the key managing unit 131 delivers an encryption key to the storage managing unit 132 and, accordingly, the storage managing unit 132 decrypts data from the stored encrypted content (S9). Subsequently, the storage managing unit 132 makes an initialization request of a data storage region associated with the URL1 to the browser 111, and the browser 111 performs an initialization process of securing a data storage region with respect to the URL1 in the auxiliary memory 107 (S12).

Refer to FIG. 17

Processes that differ from FIG. 8 are processes 514A and 515A in which the launcher 130 acquires encrypted content of the application 1 and the scene 1 (AP1+SC1) and an encryption key from the storage managing unit 132.

Refer to FIG. 18

The browser 111 executes the application 1 (S21) and writes updated data into the data storage region SD. Subsequently, when the launcher detects termination of the application 1 (S22), the launcher 130 makes a request to the storage managing unit 132 for encryption of data of the application 1 and the scene 1 (AP1+SC1) and termination (S23A). In response to the request, the storage managing unit 132 saves data of the application 1 and the scene 1 from the data storage region SD associated with the URL1 and requests the browser 111 to perform a termination process of the application 1 (S25). Accordingly, the browser 111 terminates the application 1 and erases data in the data storage region SD.

In addition, the storage managing unit 132 acquires an encryption key of the application 1 and the scene 1 (AP1+SC1) (S26A), and encrypts and temporarily stores the data (S27). Furthermore, the storage managing unit 132 requests the key managing unit 131 to generate a policy file PF based on a scene of the terminal (S44). The key managing unit 131 detects the current scene of the terminal, generates a policy file PF, and sends back the policy file PF to the storage managing unit 132 (S45). The policy file PF is temporarily stored.

When the application 1 is not executed for a certain period of time, the launcher 130 makes a request to the storage managing unit 132 for, and acquires, encrypted data of the application 1 and the scene 1 (AP1+SC1) and the policy file PF generated by the key managing unit (S29A). In addition, the launcher 130 uploads the encrypted data of the application 1 and the scene 1 (AP1+SC1) and the policy file PF to the application server 20 (S30A). In response thereto, based on information in the policy file PF, the application server 20 stores the uploaded encrypted data as data corresponding to the application 1 and the scene 1 in the policy file PF (S46). Furthermore, the application server 20 updates the data management DB based on the policy file PF.

Accordingly, when the terminal device 10 next requests that encrypted data of the application 1 and the scene 1 be downloaded, the application server 20 can transmit the requested encrypted data and the policy file PF to the terminal device.

Since the policy file PF including an application name and a scene name is uploaded to the application server 20, it can be prevented that encrypted data for business is stored as private encrypted data and, subsequently, the encrypted data for business is viewed by a malicious third party in a private scene. In addition, since the data management DB is also updated due to the policy file PF, a policy file PF can be created by referring to the data management DB in a subsequent online state.

As described above, in the third embodiment, by managing data as a basis of a combination of an application and a scene of a terminal and by using a policy file, a key managing unit of a terminal device can confirm in an offline state the use of data in an online state permitted by an application server. As a result, a malicious third party can be prevented from intentionally changing a scene of the terminal device to a scene that differs from an actual scene and peeking into confidential data. In addition, by using a policy file, data can be securely stored as data corresponding to an application and a scene in an application server that is a secure file system.

According to the present embodiment, security of data updated while a local application is being executed in an application push system can be increased.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing therein an application execution program for causing a computer to execute a process comprising:
    associating an external address outside of a terminal device with an application stored in a memory in the terminal device;
    performing an initialization process of securing a data storage region associated with the external address;
    booting an internal web server to which the external address is assigned, the internal web server being formed in the terminal device;
    causing a browser to access the internal web server at the external address and acquire the application stored in the memory in an offline state;
    causing the browser to execute the application and access data in the data storage region in the terminal device associated with the external address in an offline state; and
    erasing the data in the data storage region, after terminating the browser execution of the application.

2. The non-transitory computer-readable storage medium according to claim 1, the process further comprising:
    after the initialization process, writing data with respect to the application stored in the memory, into the data storage region.

3. The non-transitory computer-readable storage medium according to claim 2, the process further comprising:
    saving data in the data storage region;
    after saving the data, causing the browser to terminate execution of the application and erase the data in the data storage region; and
    storing the saved data in a secure file system.

4. The non-transitory computer-readable storage medium according to claim 2, the process further comprising:
    in an online state in which the terminal device is able to communicate with an application server, downloading the application and data of the application from the application server and storing the application and the data in the memory of the terminal device, wherein
    in an offline state in which the terminal device is unable to communicate with the application server, the causing the browser to access the internal web server at the external address and acquire the application stored in the memory, and the causing the browser to execute the application and access data in the data storage region in the terminal device associated with the external address are performed.

5. The non-transitory computer-readable storage medium according to claim 4, the process further comprising:
    saving data in the data storage region;
    after saving the data, causing the browser to terminate execution of the application;
    generating a second policy file including a state of the terminal device upon terminating the execution of the application; and
    uploading the saved data and the second policy file to the application server.

6. The non-transitory computer-readable storage medium according to claim 2, the process further comprising:
    in an online state in which the terminal device is able to communicate with an application server, downloading encrypted content of the application and data of the application, and a first policy file including a state of the terminal device corresponding to the data of the application from the application server, and storing the encrypted content and the first policy file in the memory of the terminal device; and
    in an offline state in which the terminal device is unable to communicate with the application server, when the state of the terminal device upon activation of the application is consistent with the state of the terminal device in the first policy file, decrypting the encrypted content and storing the data of the application in the data storage region.

7. The non-transitory computer-readable storage medium according to claim 1, the process further comprising:
    saving data in the data storage region;
    after saving the data, causing the browser to terminate execution of the application; and
    storing the saved data in a secure file system.

8. The non-transitory computer-readable storage medium according to claim 1, the process further comprising:
in an online state in which the terminal device is able to communicate with an application server, downloading the application and data of the application from the application server and storing the application and the data in the memory of the terminal device, wherein
in an offline state in which the terminal device is unable to communicate with the application server, the causing the browser to access the internal web server at the external address and acquire the application stored in the memory, and the causing the browser to execute the application and access data in the data storage region in the terminal device associated with the external address are performed.

9. The non-transitory computer-readable storage medium according to claim 1, wherein
when performing the initialization process, a read/write function for performing a read process from the data storage region by decrypting read data and performing a write process to the data storage region by encrypting data is registered in association with the external address, and
access by the browser to the data storage region that is performed while the application is being executed is performed via the read/write function.

10. An application execution method of an application stored in a memory of a terminal, comprising:
associating an external address outside of the terminal device with the application stored in the memory in the terminal device;
performing an initialization process of securing a data storage region associated with the external address;
booting an internal web server to which the external address is assigned, the internal web server being formed in the terminal device;
causing a browser to access the internal web server at the external address and acquire the application stored in the memory in an offline state;
causing the browser to execute the application and access data in the data storage region in the terminal device associated with the external address in an offline state; and
erasing the data in the data storage region, after terminating the browser execution of the application.

11. The application execution method according to claim 10, further comprising:
after the initialization process, writing data with respect to the application stored in the memory, into the data storage region.

12. The application execution method according to claim 10, further comprising:
saving data in the data storage region;
after saving the data, causing the browser to terminate execution of the application; and
storing the saved data in a secure file system.

13. The application execution method according to claim 11, further comprising:
saving data in the data storage region;
after saving the data, causing the browser to terminate execution of the application; and
storing the saved data in a secure file system.

14. A terminal device that executes an application stored in a memory in a terminal device, the terminal device comprising:
an association unit that associates an external address outside of a terminal device with an application stored in a memory in the terminal device;
an initialization unit that performs an initialization process of securing a data storage region associated with the external address;
a boot unit that boots an internal web server to which the external address is assigned, the internal web server being formed in the terminal device;
an acquiring unit that causes a browser to access the internal web server at the external address and acquire the application stored in the memory in an offline state;
an access unit that causes the browser to execute the application and access data in a data storage region in the terminal device associated with the external address in an offline state; and
an erase unit that erases the data in the data storage region, after terminating the browser execution of the application.

* * * * *